United States Patent [19]

Finzel

[11] Patent Number: 5,015,062
[45] Date of Patent: May 14, 1991

[54] SPLICE UNION FOR THE MECHANICAL JOINING OF TWO LIGHT WAVEGUIDES

[75] Inventor: Lothar Finzel, Munich, Fed. Rep. of Germany

[73] Assignee: Siemens Aktiengesellschaft, Berlin & Munich, Fed. Rep. of Germany

[21] Appl. No.: 442,544

[22] Filed: Nov. 28, 1989

[30] Foreign Application Priority Data

Dec. 2, 1988 [DE] Fed. Rep. of Germany ....... 3841081
Aug. 1, 1989 [DE] Fed. Rep. of Germany ....... 3925826

[51] Int. Cl.$^5$ .............................................. G02B 6/38
[52] U.S. Cl. ................................ 350/96.21; 350/96.2
[58] Field of Search ........................... 350/96.2, 96.21

[56] References Cited

U.S. PATENT DOCUMENTS 4,354,731 10/1982 Mouissie .......................... 350/96.21
4,755,018 7/1988 Heng et al. ....................... 350/96.21
4,850,671 7/1989 Finzel ............................... 350/96.21
4,927,229 5/1990 Tanaka et al. .................... 350/96.21

FOREIGN PATENT DOCUMENTS 0188392 7/1986 European Pat. Off. .
0284658 10/1988 European Pat. Off. .
52-32340 3/1977 Japan .
1-32210 2/1989 Japan .

Primary Examiner—John D. Lee
Assistant Examiner—John Ngo
Attorney, Agent, or Firm—Kenyon & Kenyon

[57] ABSTRACT

A splicing device comprises a bottom part with a V-notch and a cover part to be fixed thereon, the two parts being held together by a metal sleeve. The necessary pressing force for satisfactory fixing of the light waveguides to be joined in the V-notch is brought about by a permanent plastic deformation of the metal sleeve in the region of cutouts in the bottom and cover parts.

5 Claims, 1 Drawing Sheet

SPLICE UNION FOR THE MECHANICAL JOINING OF TWO LIGHT WAVEGUIDES

BACKGROUND OF THE INVENTION

The present invention relates to a splicing device for the mechanical joining of two light waveguides having a bottom part bringing about the fixing of the light waveguides to be joined and a cover part to be pressed on.

Splice unions in which the light waveguides (LWG) to be joined are guided and fixed in notch or groove type cutouts are known in numerous forms. Merely by way of example reference is made to European Patent No. 0188392. If such a union is to be used on a large scale, it must be of simple design and of cost-efficient construction. For reasons of low costs, the use of permanent splice connections is preferred, because these generally have much fewer parts.

SUMMARY OF THE INVENTION

It is an object of the present invention to provide a permanent splice union of the initially mentioned kind which is of especially simple design and cost-efficient construction. For reasons of low costs, the use of permanent splice connections is preferred, because these generally have fewer parts.

The above and other objects of the invention are achieved by a splicing device for the mechanical joining of two light waveguides having a bottom part that brings about the fixing of the light waveguides to be joined and a cover part to be pressed on, wherein the device has associated with it a metal sleeve in the form of a prismatic or cylindrical body, which sleeve can be slipped onto the two splice parts and is deformable in the slipped-on state.

With such a splicing device, the permanent deformation of the metal sleeve can be brought about with few manipulations with the aid of a relatively simple tool, so that the splicing of two LWGs can be carried out with the device according to the invention quickly and simply.

A preferred form of realization of the invention is obtained when the two splice parts have bevels in their edge region at the level of the joint of the two splice parts. In this case, a special space exists in the region of the joint, so that a sufficient depth for a permanent plastic deformation of the holding metal sleeve can be brought about.

BRIEF DESCRIPTION OF THE DRAWINGS

The invention will be described in greater detail in the following detailed description with reference to the drawings, in which:

FIG. 1 shows a longitudinal section of a light waveguide connector with sleeve slipped on;

DETAILED DESCRIPTION

Figure 1:
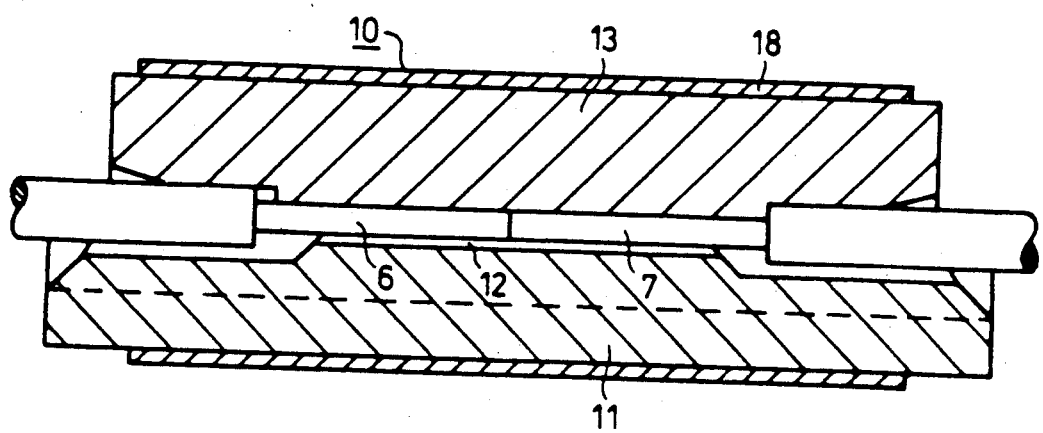
Figure 2:
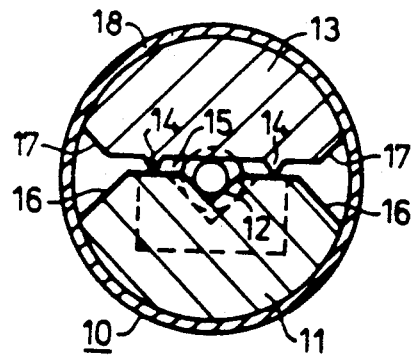
FIG. 2 shows a corresponding transverse section.
Figure 3:
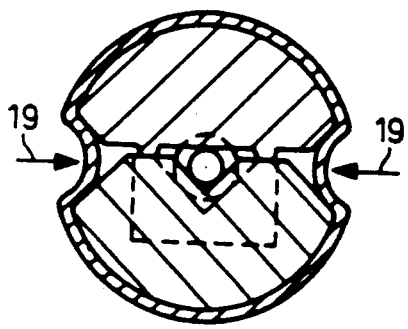
FIG. 3 shows, in a comparable transverse section, the completed deformation of the sheet metal sleeve in the region of the joint.

The splicing device 10 consists of a bottom part 11 with a V-notch 12, in which the ends 6 and 7 of light waveguides to be jointed are inserted. These light waveguides are fixed by a cover part 13 to be placed on part 11, on the underside of which cutter type spacer strips 14 ensure sufficient clearance during introduction of the light waveguide fibers. The bottom part 11 as well as the cover part 13 have in the region of the joint 15 between the two parts bevels 16, 17. A metal sleeve 18 adapted to the form of the circumference of these two parts is slipped onto the two parts 11 and 13. Thus, the metal sleeve forms a prismatic or cylindrical hollow body.

When the two LWG ends 6 and 7 have been made to abut in the guide notch 12, the sleeve is plastically deformed in the region of the bevels 16, 17 by radially oriented external forces (arrows 19) which act in the plane of the joint 15 and permanently deform the metal sleeve 18 so that the sleeve hugs the cutouts 15, 17, thereby bringing about a permanent force for the immobile fixation of the cover part 13 on the bottom part 11. In so doing, the cutter type spacer strips 14 become deformed or, at appropriate different hardness of the two parts 11 and 13, penetrate into the bottom part 11. In any event, by the process the joint space 15 is reduced and the cover part brought closer to the bottom part.

Figure 4:
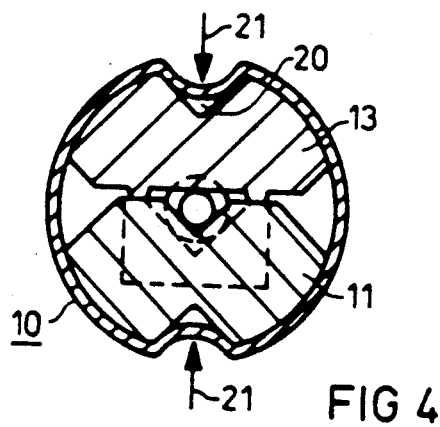
FIG. 4. shows, in a comparable transverse section, the completed deformation of the sheet metal sleeve approximately perpendicular to the joint.

FIG. 4 shows in a transverse section the new splicing device 10, where the two parts 11 and 13 each have approximately perpendicular to the joint a notch 20, into which the metal sleeve 18 is plastically deformed by forces in the direction of the arrows 21.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A splicing device for the mechanical joining of two light waveguides at a joint, said device having a bottom part for fixing the position of ends of the light waveguides to be joined and a cover part to be pressed on the bottom part over the light waveguide ends, further comprising a metal sleeve, which is slipped onto the cover and bottom parts and is deformed in the slipped-on state by radially oriented external forces which permanently deform the metal sleeve into at least one space disposed in the region of the joint.

2. The splicing device recited in claim 1, wherein the sleeve is in the form of at least one of a prismatic or cylindrical body.

3. The splicing device recited in claim 1, wherein the bottom and cover parts have bevels in edge regions at the level of the joint between the bottom and cover parts.

4. The splicing device recited in claim 1, wherein the bottom and cover parts have notches approximately perpendicular to the joint.

5. The splicing device recited in claim 1, wherein the cover part is brought closer to the bottom part by the permanent deformation of the metal sleeve.

* * * * *